United States Patent [19]

Detroit et al.

[11] 4,296,813
[45] Oct. 27, 1981

[54] WELL CEMENTING

[75] Inventors: William J. Detroit, Schofield; Michael E. Sanford, Wausau, both of Wis.

[73] Assignee: American Can Company, Greenwich, Conn.

[21] Appl. No.: 766,079

[22] Filed: Feb. 7, 1977

Related U.S. Application Data

[62] Division of Ser. No. 671,159, Mar. 29, 1976, Pat. No. 4,065,318.

[51] Int. Cl.³ .......................... C04B 7/02; C04B 7/35; C07G 1/00; E21B 33/13
[52] U.S. Cl. ...................................... 166/293; 106/90; 106/315
[58] Field of Search .......... 106/90, 314, 315; 166/293, 294; 260/124 R

[56] References Cited

U.S. PATENT DOCUMENTS

| | | | |
|---|---|---|---|
| 3,100,526 | 8/1963 | Martin | 106/315 |
| 3,582,375 | 6/1971 | Tragesser | 106/315 |
| 3,723,145 | 3/1973 | Haldas et al. | 106/315 |
| 3,748,159 | 7/1973 | George | 106/315 |
| 3,754,953 | 8/1973 | Martin | 106/315 |
| 4,047,567 | 9/1977 | Childs et al. | 106/315 |

Primary Examiner—Stephen J. Novosad
Attorney, Agent, or Firm—Robert P. Auber; George P. Ziehmer; N. Jerome Rudy

[57] ABSTRACT

Wells and like borings into the earth's surface, especially those for the production of petroleum and gas, are very well and efficaciously cemented with cement compositions or pastes containing, as their effective gel control and cement set retardation agent, an additive that is a resulfonated, alkaline oxidized, hydrolyzed, partially desulfonated lignosulfonate product.

18 Claims, 2 Drawing Figures

AVERAGE SPREAD OF RETARDATION TIME OF: (i)
CONVENTIONAL "LIGNOSULFONATE" ADDITIVE (40 MIN—4 HRS., 5 MIN.)
AND (ii) RESULFONATED DESULFONATED LIGNOSULFONATE
ADDITIVE (3.0 — 3.5 HRS.)

WELL CEMENTING

This is a division of application Ser. No. 671,159, filed Mar. 29, 1976, now U.S. Pat. No. 4,065,318.

GENERAL BACKGROUND OF THE INVENTION

The increased number of deep wells being drilled and the encounterments, during drilling, of abnormally high temperature gradients has led to the development of cement retarders to be used to help extend the pumpability of manufactured cements currently available. It is extremely desirable in such connection to have longer thickening times in the cementing compositions employed when they are used under high temperature conditions. These demands, oftentimes, cannot be met with presently available (including commercial) retarded cements (such as API Classes D and E).

At the present time, very few cementing compositions are used to cement wells below 12,000 feet where static temperatures are in excess of 260° F., unless additional retarder is utilized. Observation of cementing compositions currently used in wells 10,000 feet and deeper indicates that a large number of the compositions employed contain additives to modify the properties of the basic cement. These additives, in addition to retarders, can frequently be light-weight clay and equivalent mineral materials (such as bentonite, Diacel D, etc.) silica flour, heavy-weight materials (such as Hi-Dense No. 2, barite, etc.) or any of the many other materials and component additives available for altering the properties of the cement composition used.

The selection of a retarder that will be compatible with the manufactured retarded cements, which in themselves usually contain a retarder, sometimes becomes a difficult task. Compounds such as lignins (salts of lignosulfonic acid), gums, starches, various weak (oftentimes organic) acids, and cellulose derivatives have been used in the manufacture of commercial retarded cements. One of the first retarders developed in the trade was a blend of borax, boric acid and gum arabic. Due to blending problems, this retarder was exceedingly difficult to handle at bulk cement plants. Nonetheless, much actual use has been had of such retarders for commercial retarded cements prior to the time that ameliorated retarders were developed.

The primary factor and influence that governs the use of additional retarder is the temperature of the well. As the temperature increases, the chemical reaction between the cement and water is accelerated. This, in turn, reduces the thickening time or pumpability of the cement composition or paste. The use of additives with high water ratios also necessitates the use of additional retarder to obtain the desired thickening time. This can be due to one or both of the following fundamental factors, namely: (1) high surface materials, which generally have high water requirements, which adsorb part of the retarder leaving less to affect the retardation of the cement; and (2) additional water which further dilutes the concentration of retarder and thereby reduces its retarding potential.

Most currently available retarders can be used with the basic cementing compositions containing API Class A, D, or E cements, Pozmix-Cement and Pozmix 140 blended with various additives. Appropriate test data available in the art coupled with developed laboratory observations can indicate the performance of cementing compositions and the like with and without retarder when used to depths of 12,000 feet or where static temperatures are in the range of 260° to 275° F. Where bottom hole conditions exceed these values, it is normally recommendable that thickening time tests be made, in the laboratory, on the specific component parts of the slurry (or paste) prior to the actual cementing job. Variations in thickening times are not due solely to down hole conditions of temperature and pressure. They frequently, pragmatically speaking, may be the result of irregularities in the basic cement.

Further quite pertinent art and direction in the area of well cementing and the like practices includes the Report Prepared By The API MID-CONTINENT DISTRICT STUDY COMMITTEE ON CEMENTING PRACTICES AND TESTING OF OIL-WELL CEMENTS issued by AMERICAN PETROLEUM INSTITUTE (i.e., "API"), Division of Production, in Dallas, Tx. 75201 as API Bulletin D-4, Corrected Edition of March 1963, entitled "*The Effects Of Drilling-Mud Additives On Oil-Well Cements*"; "*API Specification For Oil-Well Cements And Cement Additives*" (API Std 10A, Fourteenth Edition, dated April, 1969); and "*API Recommended Practice For Testing Oil-Well Cements And Cement Additives*" (API RP 10B, Sixteenth Edition, dated April, 1969).

PATICULARIZED BACKGROUND OF THE INVENTION

Various and numerous sulfonated and otherwise derived lignin materials have already been found, known and developed and advantageously applied in well cement compositions as retarding agents therefor. U.S. Pat. No. 2,880,102 is specifically illustrative of this. Considered generically, these lignosulfonate materials even include the alkaline oxidized, partially desulfonated lignosulfonates of the type prepared according to the teachings and disclosures of U.S. Pat. No. 2,491,832 which are prepared from treatments of alkaline sulfite waste pulping liquor from wood conversion.

While numerous references are available dealing in one capacity or discipline or another with the identity and nature of lignin, per se, and many of the derivatives of lignin including lignosulfonates (all of which, by the way, are generally relatively imprecise and not positively definite), preparation and multitudinous uses of the contemplated materials, substantial elucidation thereupon and thereof may also be found, by way of illustration, in U.S. Pat. Nos. 1,848,292; 2,371,136; 2,371,137; 2,505,304; 2,576,418; 2,598,311; 2,800,449; 3,156,520; and 3,726,850. Still additional art of interest is uncovered in U.S. Pat. No. Re. 18,268; U.S. Pat. Nos. 2,057,117; 2,104,701; 2,399,607; and 2,434,626.

Another excellent informational source in this area is the Bulletin (No. 131) published by AMERICAN CAN COMPANY of Greenwich, Connecticut 06830 (U.S.A.) entitled "*Chemicals From Wood*".

The alkaline oxidized, hydrolyzed, partially desulfonated lignosulfonates which are utilized as the starting materials to obtain the retardant resulfonated lignosulfonate additives used in and for well cementing compositions, and so forth, in practice of the present invention are, as indicated, usually most readily and conveniently obtained pursuant to the teachings of U.S. Pat. No. 2,491,832. In this patented process, especially if and when enhanced by-product yields of vanillin are wanted, it is frequently more desirable to employ a waste pulping liquor for the process which is derived from a totally, or at least substantially, softwood source—although this is not an entirely restrictive limitation since hardwood starting materials may also be used.

Using the process patented in U.S. Pat. No. 2,491,832, the degree of desulfonation realized is a factor of and controlled by the amount of caustic interjected for the reaction; the strength of the oxidation effected (i.e., the relative amount of air or oxygen employed—being careful to avoid such severe oxidation conditions as might induce demethylation); the reaction time and temperature schedules followed, and the solids dilution, generally aqueous, of the lignosulfonate-containing spent sulfite liquor effluent being treated (with greater dilution conditions tending to lead to more extensive desulfonation probably due to the thereby increased availability of the reacting molecules to the oxidizing influence applied).

While very desirable partially desulfonated lignosulfonate materials are prepared with the alkaline oxidation conducted on a spent sulfite liquor containing, on a weight percent basis, from about 30 to 35% of dissolved solids, the spent liquors being cooked in the desulfonation process may have as little as 14–10% to as much as 40% solids content in order to obtain beneficial desulfonated products.

Practically, almost any caustic alkaline solution can be employed for effecting the partial desulfonation reaction, although lower alkalinity generally results in less desulfonation. More caustic is required when sugars and other saccharides are present (and they are usually present with otherwise untreated spent sulfite liquors) in any varied or more substantial amounts in order to effect the decomposition of such saccharides. Ordinarily, very good results are achieved when sufficient caustic concentration is maintained throughout the desulfonating cook to maintain the reaction mass in the relatively high pH range of between about 10.5 to about 11. For example, a quite satisfactory proportion of lignosulfonate solids to caustic to employ in the reaction mass involves use of an aqueous lignosulfonate solution of about 31–32 wt. % and having a specific gravity around 1.22–1.24 or so containing a caustic concentration in the solution of about 140 gms. NaOH/liter.

Adequate oxidation conditions to achieve desired ranges of desulfonation of the lignosulfonate in the spent sulfite liquor may be achieved by providing, almost invariably from either air or oxygen passed through the cooking reaction mass, between about 20–25 or so and about 40–50 or so grams of elemental oxygen (i.e., $O_2$) per each 100 grams of lignin in the lignosulfonate material being desulfonated. In actual practice to obtain a frequently more desirable range of partially desulfonated material, between about 27 and 35 grams of $O_2$ per gram of lignin are utilized.

While variations may be encountered, temperatures on the range of from about 140° C. to about 170° C., advantageously in the neighborhood of 165° C., are usually most desirable to utilize. Of course, the reacting mass is cooked until the desired degree of desulfonation (or, when vanillin by-product is important, the desired yield of it) is obtained. Usually and at the 165° C., level the cooking time is on the order of 45 minutes or so; the optimum time to employ, as will be appreciated by those skilled in the art, depending on reaction conditions and the particular degree of desulfonation desired in the resulting partially desulfonated lignosulfonate material. It is oftentimes most advantageous (if not literally necessary for material handling purposes) to terminate the cooking while some free caustic still remains in the reaction mass. This tends to prevent problems of emulsification during subsequent recovery of the partially desulfonated lignosulfonate. Beneficially and for the indicated purpose, the reaction may accordingly be finished when, say, about 4–5 gms./liter of free NaOH is found to remain in the reaction mass.

Practice of the process of U.S. Pat. No. 2,491,832 yields, in effect, a spent oxidized liquor which, as has been disclosed and as is known, contains partially desulfonated, generally acid-insoluble, chemically altered organic lignin substances. These are usually isolated and/or fractionated by acid (namely, sulfuric) precipitation which eliminates various sludge-producing, mostly calcium-based, ingredients therein. After the precipitation, the purified partially desulfonated lignosulfonate material is generally dissolved in caustic to yield a sodium salt; then spray or otherwise dried to yield a powder product—although, if desired, it may be finally prepared and used in an undried liquified form or reconstituted to an aqueous liquid of any desired concentration.

The partially desulfonated lignosulfonate material thus obtained is not directly procurable from original spent sulfite liquors as are the normally-gotten and ordinarily so-called, albeit undesulfonated, "lignosulfonates" (the "water soluble" calcium or equivalent lignosulfonate salt or lignosulfonic acid described in U.S. Pat. No. 2,880,102 being typical of same). To the contrary, the partially desulfonated lignosulfonate additive products of reference are exceptionally pure materials containing essentially no sugars or polysaccharides and having only vanishing traces, if any, of combined sulfur in sulfite form; and further having other inherent distinguishing features including relatively uniform and substantially constant relative molecular size characteristics.

Although a sugar and saccharide-containing spent sulfite liquor is desirable to employ as the starting material for preparation of partially desulfonated lignosulfonates from which the resulfonated compositions used as cement retardants in the present invention are derived, otherwise treated spent sulfite liquors may equivalently be utilized. These, for example, may be those which have previously been treated in divergent ways and for other initial conversion purposes wherein the sugars and/or saccharides are utilized and consumed, as in the preliminary manufacture from raw spent sulfite liquor of yeast or alcohol or in other ways giving a sugar and/or saccharide -reduced or -free spent sulfite liquor.

The alkaline oxidized, partially desulfonated lignosulfonates which are anionic polyelectrolytes with molecular weights usually on the order of 1,000 to 20,000 and from which the resulfonated products employed as cement retardants pursuant to instant practice are obtained generally have an organic sulfonic sulfur, i.e., $-SO_3$, content, calculated as percent sulfur by weight of broadly between about ½ and about 5 wt. %. More advantageously for many purposes, this sulfur range is between about 1¾ and about 3¼ wt. %; while quite often it is preferable for the partially desulfonated lignosulfonate to contain from about 2.2 to about 2.8 wt. % of the combined sulfur in the sulfonic form.

A commercially available product, "MARASPERSE CB" (TM), obtainable from AMERICAN CAN COMPANY, is an example of an alkaline oxidized, hydrolyzed, partially desulfonated lignosulfonate material useful as the starting material from which to derive the solubilized, re-sulfonated lignosulfonates cement retarding additives of the present invention.

"MARASPERSE CB", as usually available, generally has the following typical analysis parameters and physical characteristics features:

| TYPICAL ANALYSES (Moisture-Free and Wt. % Basis): | |
|---|---|
| pH - 3% Solution | 8.5–9.2 |
| Total Sulfur as S, % | 2.5–2.9 |
| Sulfate Sulfur as S, % | 0.1–0.25 |
| Sulfite Sulfur as S, % | 0–0.05 |
| CaO, % | 0.02–0.05 |
| MgO, % | Trace–0.03 |
| Na$_2$O, % | 9.4–9.9 |
| Reducing sugars, % | 0 |
| OCH$_3$, % | 12.4–12.9 |
| Sodium Lignosulfonate, % | 99–99.6 |
| Solids, % | 92–94 |
| ULTRAVIOLET ANALYSES (K-value representing base line): | |
| Upper UV: | |
| K solids at Max. (275 mu) | 29–30.5 |
| K OCH$_3$ Max. | 225–250 |
| Differential UV: | |
| Max. nm | 250–252 |
| K Solids at Max. | 10–11.3 |
| K OCH$_3$ at Max. | 82–88 |
| Baseline K Solids | 9.5–10.5 |
| Phenolic OH, % | 1.8–2.1 |
| OH/OCH$_3$ | 0.26–0.30 |
| PHYSICAL CHARACTERISTICS: | |
| Usual Form | Powder |
| Moisture Content (Max., % H$_2$O) | 8.0 |
| Color | Black |
| Bulk Density (lbs./cu. ft.) | 43–47 |
| Solubility in Water (%) | 100 |
| Solubility in Oils and Most Organic Solvents (%) | 0 |
| Surface Tension, 1% Sol'n (in dynes/cm) | ca. 51.4 |

While the known alkaline oxidized, hydrolyzed, partially desulfonated lignosulfonates, including such things as "MARASPERSE CB", are excellent surfactant, dispersant, detergent and otherwise attractively-propertied materials which are very good as cement retarding additives under many circumstances, they still have certain intrinsic inadequacies and limitations leaving some desiderata and unfulfilled capability for use in many crucial well cementing applications and for expanded applicability in and for this highly advantageous purpose. Noteworthy amongst these are difficulties in the employment of the mentioned partial desulfonated lignosulfonates are their relatively limited solubility in saline solutions plus their sometimes not totally satisfactory reliability and predictability as to set retarding and gel control, especially time-wise, of well cement compositions and pastes in which they are incorporated.

FIELD AND OBJECTIVES OF THE INVENTION

This invention pertains to and resides in the general field of well cementing in the area of new and improved cementing and the like compositions and their method of preparation; more particularly as to a greatly effective highly saline salt solution tolerant and predictable gel control and retardant additive agent for exceptionally beneficial and useful well cementing operations. The agent involved in the well cementing compositions and preparation thereof in practice of the present invention is an exceptionally pure lignosulfonate derivative of the type disclosed in the copending, concurrently filed Application for United States Letters Patent of the present Applicants entitled "SOLUBILIZED LIGNOSULFONATES DERIVATIVIES" having Ser. No. 671,397, filed Mar. 29, 1976 (U.S. Pat. No. 4,069,217). Provision of the vastly improved well cementing compositions and techniques (including preparation thereof) in and for many of a very wide gambit of well cementing and the like purposes as well as many other of the salient propensities and capabilities and satisfactory characteristics of presently-contemplated practice is amongst the principal aims and objectives of the invention.

PARTICULARIZED DESCRIPTION OF THE INVENTION

Figure 1:
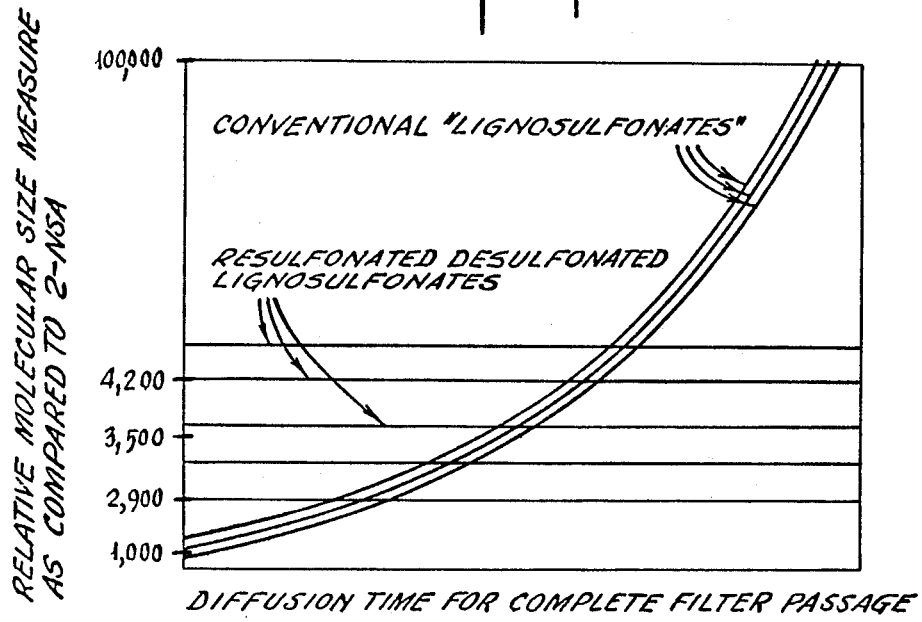
FIG. 1 is a graph showing the relative molecular size properties of the lignosulfonate additives of the invention in contrast to conventional products known heretofore.

Conventional oil well cements and the like comprised of hydraulic cement, sometimes and optionally colloidal clay or equivalent, and various additaments in small proportions are known. They are generally supplied as premixes to be slurried at the well site with water for intended usage in the well.

The well cementing compositions of this invention are, basically, a hydraulic cement preparation (which, as may be desired, can also be comprised of clays and the like and/or other functional additaments) containing as a gel control and retardation additive agent a resulfonated derivative of the above-described and identified alkaline oxidized, hydrolyzed, partially desulfonated lignosulfonates. Besides their unique chemical constitution, the additive agents employed are characterized in having (as compared to most other so-called lignosulfonates) an evened-out and/or very similarly dimensioned relative molecular size range within a 10–20% size measure from any given constant (particularly in volumetric comparison with the molecular size of 2-naphthalene sulfonic acid); a solubility—especially as regards saline solution tolerance or compatibility and/or in aqueous acidic media at least 10 percent and usually 2 or 3 times greater than that of the partially desulfonated lignosulfonate starting material from which the resulfonated additives used in the present invention are derived; and a substantially increased, i.e., at least 50 percent and up to 15–20 times surfactant and dispersant activity.

The resulfonated additive materials for the well cements are readily obtained by the direct sulfonation or sulfoalkylation of the referenced alkaline oxidized, hydrolyzed, partially desulfonated lignosulfonate starting material. Ordinarily and most conveniently, this is done with appropriate sulfonating reagents in an aqueous solution of the starting material, advantageously using agitation during the reaction (which is better when applied vigorously and may be either by mechanical mixing or stirring and/or from the agitating effects of steam being pressed into the reaction mass when steam is used for heating), at any desired suitable temperature. In general, the reaction can be conducted over a temperature range from about 50° C. to about 200° C., although it is ordinarily desirable to run at least at the boil (i.e., about 100° C. or so) in order to avoid unduly long reaction times. Ordinarily, a temperature on the order of 160° C. is satisfactory for most of the resulfonations done. Of course, the reaction is accomplished under corresponding pressure when temperatures over boiling are utilized. The time of reaction generally varies with the temperature involved; lower temperatures requiring longer times. At higher temperatures the resulfonations can be completed in as little as ½ hour or so while temperatures at the lower end of the scale may require as much as 16 or more hours for completion. When conducted at about 160° C., the resulfonation cooking is usually completed within about an hour.

Any suitable sulfonation reagents may be used for the resulfonation reaction. When straight sulfonations are desired, they may be advantageously accomplished with an alkali metal (such as sodium) bisulfite or sulfur dioxide. Sulfoalkylations, as are frequently quite desirable, are done with mixtures of an appropriate lower alkyl aldehyde and a bisulfite. The sulfonate group, per se, that is attached in straight sulfonation is, of course, $-SO_3H$. The sulfoalkylates, which ordinarily involve 1 to 3 carbon atom alkyl units, are of the structure $-(CH_2)_x-SO_3H$, wherein x is usually an integer from 1-3 and when x is plural the alkyl unit may be linear in attachment or, as is probably the more frequent case, comprised of side-chain arrangements.

The aldehyde utilized in at least approximative stoichiometric proportions with the bisulfite in the sulfoalkylations preformed for the resulfonation is generally of the structure: RCH:O, wherein R is any desired 0-3 carbon atom-containing alkyl group. Obviously, if desired, mixed aldehyde reaction systems may be utilized even though there is ordinarily no particular advantage in this. Usually, it is very desirable to accomplish the resulfonation with a sulfomethylating reaction using formaldehyde ($CH_2O$) and sodium bisulfite ($NaHSO_3$) as reagents so as to make sulfomethyl ($-CH_2SO_3H$) attachments in the resulfonated product.

As indicated, about stoichiometric relative proportions of the aldehyde and bisulfite reagents are employed for the resulfonation; these being used in amounts calculated to effect the desired extent or quantity of sulfonic acid units in the finally obtained resulfonated product. Actually, a plus or minus 20% tolerance from exactly stoichiometric ratios is tolerable. In sulfomethylating reactions, the amount of formaldehyde used may vary from about 1½ to about 12 wt. % of the desulfonated starting material being resulfonated while the bisulfite can correspondingly be utilized in quantities, on the same basis, of between about 5 and about 40 wt.%. A particularly desirable resulfomethylated product containing about 5½ wt. % of sulfur in organic sulfonic sulfonate form is obtained by the reaction in the described manner of "MARASPERSE CB" with about 15 wt. % of sodium bisulfite and 4½ weight % of formaldehyde, based on "MARASPERSE CB" weight, cooked for one hour at 160° C.

The resulfonated products used as additives for well cementing compositions in practice of the present invention may, as desired, contain anywhere from about 1½ wt. % to 14-15 wt. % of total sulfur in combined organic sulfonic sulfonate form. Advantageously the range of such sulfur is between about 2¾ and about 10 wt. %, with greater desirability oftentimes attained in the sulfur wt. % range of from about 4½ to about 6½ wt. %.

While it is not intended to bound by any particular theory, it is believed that the starting alkaline oxidized, hydrolyzed partially desulfonated lignosulfonate material (as obtained when following the procedures of U.S. Pat. No. 2,491,832) has the sulfonic acid group attachments at least substantially if not predominantly or entirely on the side chains of and in the lignin molecules, this ordinarily being on the side chain carbons which are in the alpha position relative to the ring and carrying over from the initial substitutions made during the original sulfite pulping operations. On the other hand and surprising as it is, it is believed the sulfonate and/or sulfoalkyl units prepared in practice of the present invention are substantially if not predominantly or entirely positioned in ortho and/or para substitutions on the aromatic rings of the lignin molecules. Thus, the resulfonated product used in practice of the instant invention as a well cement additive is, quite obviously, a basically different and dissimilar lignosulfonate from and as compared to the lignosulfonate material found in spent sulfite liquors from which are obtained the starting lignosulfonates that are resulfonated in present practice.

A typical resulfonation reaction for manufacture of the additives pursuant to the present invention may be figuratively represented by the following, presumed-to-be-accurate chemical reaction formulae:

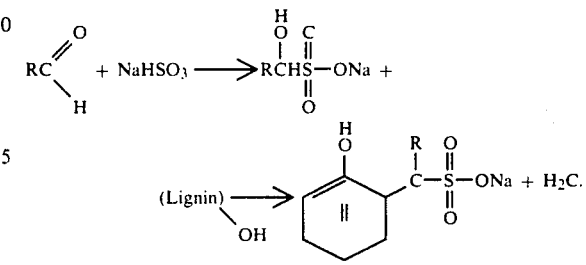

The resulfonated, alkaline oxidized, hydrolyzed partially desulfonated well cement (or cementing paste) additives of the present invention are generally employed in amounts, based on total resulting composition weight, between about 0.05 and about 3 wt. %. More often, the additive concentration employed is from about 0.2 to about 1.5 wt. % while frequently the most desirable range is from, say, 0.3 to 1 wt. %.

The particular quantity of additive employed generally depends in very large measure on the cement setting schedule (according to API criteria) being followed and the temperature encountered during actual setting of the cement composition. Usually, relatively more of the retarder additive is required when higher setting temperature conditions are encountered.

The additive resulfonated desulfonated lignosulfonates utilized in practice in accordance with the present invention are characterized in imparting to the cement compositions in which they are incorporated an excellent tolerance and resistance against premature settings and gellations under exposure to severely strong saline environments such as are frequently found in many wells due to the presence therein by infiltration or seepage of natural salt (including sea) waters. They also tend to ensure an uncommon and unusual accurate predictability as to cement setting character, speaking timewise, in the compositions under any given setting temperature and schedule; this being of obviously considerable advantage and importance for the most effective and beneficial application and efficient utilization of a well cementing composition or paste.

The compositions of the present invention are, and very desirably so, essentially gellation-free admixtures. In this, they avoid the frequent problem of gellation experienced with many cement retarder additives that are known and have been used in well cementing operations. As is readily appreciated by those skilled in the art, this is a very important factor especially for purposes of laboratory and other than actual usage test and evaluation procedures. Very beneficially in this regard, the compositions of the present invention invariably do not exhibit or cause with premature gellation any consequent and so-called pseudo false settings.

EXEMPLIFICATION OF THE INVENTION

The following detailed Illustrations more particularly delineate and show the extraordinary benefits and advantages obtained in and by practice of the present invention and with the exceptionally useful and versatile resulfonated lignosulfonate composition products involved for well cement additive utilizations.

FIRST ILLUSTRATION

Excellent quality resulfonated additives, containing about 5.5 wt. % of organic sulfonic sulfur (based on composition weight) are made in large scale preparations by the sulfomethylation of "MARASPERSE CB" containing about 2.6 wt. % of total sulfur measured as S according to the following general procedure (in which all percentages are on a weight basis):

(A). Synopsis of Procedure:

The "MARASPERSE CB" liquor is sulfomethylated by cooking one hour at 160° C. with 15% NaHSO$_3$ and 4.5% CH$_2$O.

| Molecular Weights Of Particular Reagents Involved: | | |
|---|---|---|
| Formaldehyde | CH$_2$O | 30 |
| Sodium Bisulfite | NaHSO$_3$ | 104 |

(B). Bill of Materials:

| | Basis: Per 100 lbs. | Basis: Approximate 6000-gallon Batch | | |
|---|---|---|---|---|
| | Finished Product In lbs. Solids | Gallons (U.S. Measure) | Pounds Liquid | Solids, lbs./gal. | Pounds Solids |
| "MARA-SPERSE CB" Liquor | 85.50 | 5,400 | 52,800 | 3.71 | 20,000 |
| Formaldehyde | 3.85 | 270 | 2,450 | 3.33 | 900 |
| Sodium Bisulfite | 12.80 | | 3,000 | | 3,000 |
| Total | 102.15 | | 58,250 | | 23,900 |
| Finished Additive Product | 100 | | | | 23,400 |

(C). Procedure in Detail:

1. Pump "MARASPERSE CB" liquor to process tank (about 5500 gallons);
2. Measure the volume in the tank;
3. Take a pint sample;
4. Check temperature and specific gravity of the liquor;
5. Determine the pounds per gallon of liquor solids from the gravity reading;
6. Agitate and steam the liquor to about 80° C. then
7. Add 4.5% formaldehyde based on the "MARASPERSE CB" liquor solids (A 490-lb. drum of formaldehyde at 37% solids containing 180 lbs. formaldehyde);
8. Slowly and with good agitation, add 15% sodium bisulfite based on "MARASPERSE CB" liquor solids (taking into account that if this is added too fast, it will not mix in); then
9. After the bisulfite is completely mixed in, continue agitation for 15 minutes.

II. Reaction—

1. Transfer about 1850 gallons of liquor to a feed tank for the high temperature, pressure reaction vessel while maintaining the temperature at about 80° C.
2. Dump the liquor from the feed tank to a stirred, autoclave-type, pressure, reactor;
3. Steam to 160° C.;
4. Cook one hour at 160° C.;
5. Blow the cook slowly to avoid foaming;

(D). Process Variables:

The "MARASPERSE CB" liquor should have a gravity of 1.16 to 1.18 at room temperature, (3.5 to 3.9 lbs. solids/gallon) with maximum soluble lime less than about 0.1% CaO. The addition of the bisulfite to the liquor is critical. This must be done very slowly to avoid forming a crust on the surface, which is very difficult to break up.

Following the preparation, the products are readily obtained in solid (usually powdered) alkali metal (i.e., generally sodium) salt form by spray or other drying procedures.

The resulfonated lignosulfonate products obtained from the above-specified preparation procedure have outstanding qualities and characteristics as well cement retarders in all of the particulars specified in the foregoing "PARTICULARIZED DESCRIPTION OF THE INVENTION". The additives are: soluble in synthetic and natural (such as North Sea water) salt solutions; dissolvable with ease in acid media as low as pH 1.5 or so; markedly surfactant; and have a very close molecular size range constancy of easily less than a 20% measure (and usually closer to 10% and frequently much less in this) when collated to a given standard size of molecule such as 2-naphthalene sulfonic acid (i.e., "2-NSA") as indicatable by diffusion tests through micro-size porous filter media consisted of cellulose type cell membranes, or filters, having average pore sizes of 0.4 microns.

The graph presented in FIG. 1 of the accompanying Drawing nicely demonstrates as a typical representation the very close relative molecular size constancy of the resulfonated lignosulfonate retarder additives utilized in practice of the present invention as compared to conventional and heretofore-known "lignosulfonate" products. As is apparent therein, the resulfonated desulfonated lignosulfonate additives for use in the present invention have (in contradistinction with normal and ordinarily obtained "lignosulfonates") the described relatively narrow relative molecular size average particulars.

The resulfonated products obtained by the foregoing Procedure are all found to be extremely useful and effective retarding agents to precisely control and regulate the setting under high temperature and pressure conditions even in highly saline aqueous environments.

Similar very good results, using appropriate reagents for the purpose, are realized when the resulfonated products and made by direct non-alkyl-group-containing sulfonations as well as for sulfoethylations, sulfopropylations and so forth.

SECOND ILLUSTRATION

Using resulfomethylated products prepared according to the First Illustration, a number of salt tolerance tests in extremely high concentration synthetic aqueous saline solution are performed. In each, the salt solution is made up in water to a total volume of 1 liter and is composed, in the water, of 50 gms. of sodium chloride (NaCl), 16.5 gms. of calcium chloride ($CaCl_2$) and 15.5 gms. of magnesium chloride ($MgCl_2$). About 0.50 gms. of the lignofulfonate additive material being tested is put into 2 fluid ounces (about 60 ml) of the solution. Another 50 ml. of the salt solution is then added to the mixture and the entire make-up manually shaken briefly to effect whatever preliminary dissolution can be achieved; after which it is put on a mechanical shaker for one hour to ensure as much solubilization as possible. Subsequent to that, a 10 ml. portion of the overall mixture is placed into a graduated container tube from a standard laboratory-type DeLaval Centrifuge and centrifuged for 5 minutes thereon at 20,000 RPM. The volume percent of sludge found after the centrifugation (based on original volume of centrifuged material) is then measured. In all cases, the resulfonated products of the First Illustration have never more than 2.0 and usually (at least about 9 out of 10 times) less than 1.6 volume percent of removed sludge after the centrifugation. In contrast and by application of the same saline solubility test, the general type of "MARASPERSE CB" starting material utilized in the First Illustration has about a 6 volume percent sludge level after the centrifugation analyses.

Analogous results are obtained when the same saline solubility tests are repeated excepting to utilize, as the aqueous saline media; (i) 200 grams/liter. NaCl solution; and/or "North Sea" water comprised, per liter, of 30.0 gms. NaCl, 1.16 gms. $CaCl_2$ and 5.54 gms $MgCl_2$ (giving a total dissolved content of 36.70 gms./liter of such salts).

THIRD ILLUSTRATION

A desulfonated lignosulfonate from the vanillin process containing 0.7 wt. % combined sulfur as organic sulfonic sulfonate was attempted, in a 5 gm. quantity, to be dissolved in 50 ml. of pH 1.5 sulfuric acid then filtered through a fine mesh filter. The attempted solution was very turbid in appearance and, after passage through the filter (during which it filtered very slowly), left 4.7 gms. of undissolved solids out on the filter paper.

In contrast, three resulfonated or resulfomethylated products made from the same desulfonated starting material were subjected to the same test. Sample "X" of the resulfonated or resulfomethylated product contained 1.5 wt. % combined sulfur, Sample "Y" 2.3% and Sample "Z" 2.0%. The Sample "X" solution was slightly turbid and filtered slowly but left only 0.2 gms. of undissolved solids on the filter paper. Sample "Y" was a clear brown liquid in the strong acid solution but filtered quite rapidly and left no residue (i.e., actually 0.0 gms.) on the filter paper which remained clean after filtration. Sample "Z" while producing a slightly turbid solution, also filtered rapidly and left no measurable residue on the filter paper which appeared only very slightly discolored after the filtration.

FOURTH ILLUSTRATION

A sample of "MARASPERSE CB" (2.6 wt. % S) and, for comparative purpose, a sample of a resulfomethylated derivative thereof made to a 5½ wt. % S content according to the procedure of the First Illustration were tested as dispersants for Stellar clay according to the well-known, standard ASP-200 Stellar Clay Test using for the measurement a Fann Rotational Viscosimeter obtained from the Fann Instrument Company of Houston, Tex. Values for yield point, zero gel and Fann 600°, 300°, 200°, 6° and 3° settings were obtained. The data obtained, of course, represents the force required to move a stationary clay system through the plug flow to plastic flow condition in a pipe with the numerical measurements taken in lbs./100 ft.$^2$ of pipe surface; lower readings indicating better dispersant effect by the additive as the consequence of requiring less force for the movement of the mixture through the apparatus. The results were as follows:

| Product | Yield Point | Fann° | | | | | | Zero gel |
| --- | --- | --- | --- | --- | --- | --- | --- | --- |
| | | 600 | 300 | 200 | 100 | 6 | 3 | |
| "MARASPERSE CB" | 69 | 91 | 80 | 72 | 63 | 39 | 34 | 36 |
| RESULFOMETHYLATED DERIVATIVE | 16 | 34 | 25 | 22 | 18 | 13 | 13 | 15 |

The superiority of the additive made for retarder use in accordance with the present invention is easily discernible and plainly evident from the foregoing.

FIFTH ILLUSTRATION

A series which included a composition of a normal (and not resulfonated) desulfonated lignosulfonate (as obtained from spent oxidized liquor from the vanallin process generally pursuant to the above-identified U.S. Pat. No. 2,491,832) and resulfonated (more precisely, resulfomethylated) derivatives thereof prepared according to the First Illustration hereof were tested for their propensities and capabilities to disperse and control the setting retardation times of Type I cement (i.e., similar to that prescribed in ASTM C150 Specifications) using The Fann Viscosimeter Apparatus (as described in the above Fourth Illustration) to finally measure the results. Each of the test sample compositions was made up with 300 gms. of the Type I cement (obtained from IDEAL CEMENT COMPANY), 25 gms. of NaCl (giving, in effect, in the final composition about a 15 wt. %, based on total composition weight, aqueous salt solution), 3 gms. of the lignosulfonate additive and 138 ml. of distilled water. In each case, the composition to be tested was preliminarily prepared by adding, in a laboratory-style Waring Blender operated at low speed: the lignosulfonate dispersant to the water; then the salt; followed by the cement. Shearing of each constitution was done for 10 minutes at a 40 volt setting (60 cycle AC) of the Blender. After the mixing, each sample mix was placed in the appropriate testing cup to each of which was added one drop (i.e., about 0.1 cc.) of octanol before placing each for testing in the Fann Viscosimeter. The results were as set forth in the following tabulation, wherein Sample "D" was the starting desulfonated lignosulfonate (obtained, as above-described, from a vanillin process) containing 0.66 wt. % of organically combined sulfonic sulfonate sulfur; while Samples "A", "B" and "C" were resulfomethylated derivatives thereof containing, respectively, 2.10-2.29-3.65 wt. %'s of sulfonic sulfur with additional minor quantities of non-sulfonic sulfur contained therein (all as determined by the method described at pg. 850 of "*Analytical Chemistry*" in Vol. 32, No. 7, for June 1960).

| Sample No. | Yield Point | Fann° | | | | | | Zero gel | Setting Time To Light Gel |
|---|---|---|---|---|---|---|---|---|---|
| | | 600 | 300 | 200 | 100 | 6 | 3 | | |
| "A" | 102 | 164 | 133 | 120 | 104 | 59 | 48 | 53 | 3 hrs. |
| "B" | 101 | 159 | 130 | 116 | 101 | 56 | 43 | 53 | 3 hrs. |
| "C" | 70 | 114 | 92 | 87 | 70 | 49 | 32 | 37 | 4 hrs. |
| "D" | 112 | 176 | 144 | 128 | 111 | 60 | 50 | 62 | 2 hrs. |

These data very well illustrate the improvement in cement retardation achieved with the retarder additives employed in practice of the present invention.

SIXTH ILLUSTRATION

A resulfonated desulfonated lignosulfonate retarder additive having the chemical composition specified in the Fourth Illustration was added to five different, popular, known and commercially widely employed cements for well paste preparations and each tested for setting time per API Schedule 8 using the conventional Pan American Test Apparatus Procedure.

Analogous compositions were prepared excepting to use as the retarding agent additive a well known product often employed for the purpose which was a partially purified, sugar-destroyed, calcium-based lignosulfonate obtained from AMERICAN CAN COMPANY and identified commercially as "MARABOND 21" (TM).

Figure 2:
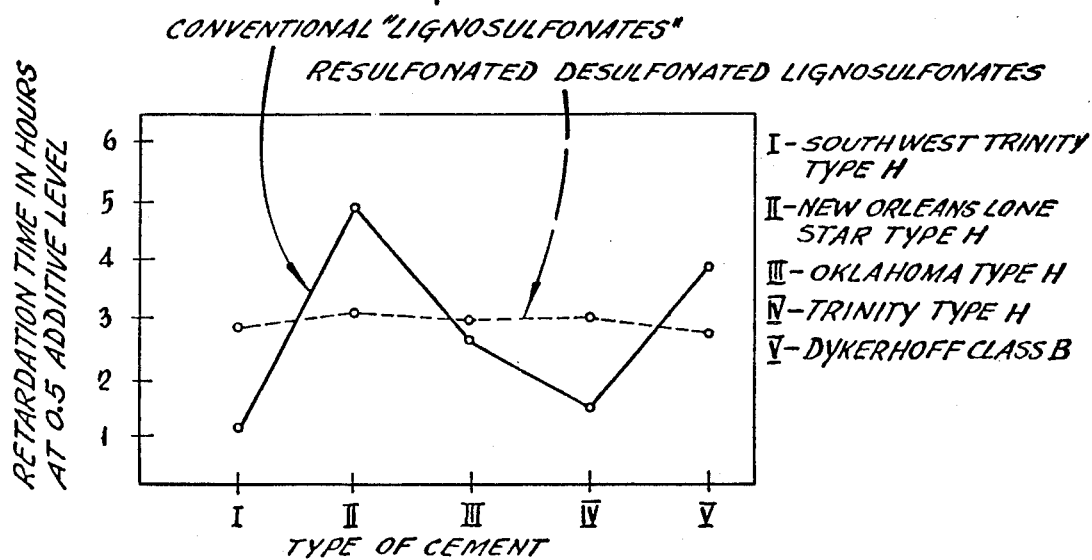
FIG. 2 is a graph illustrating the setting time predictability characteristics of the lignosulfonate additives of the invention in comparison with standard well cementing lignosulfonates known heretofore.

The comparative results obtained are set forth in the graph of FIG. 2 of the accompanying Drawing which clearly and convincingly evidences the superior setting time predictability realized in use of the resulfonated desulfonated retarder additives of the present invention. These compositions, additionally, gave no gellation problems.

SEVENTH ILLUSTRATION

Good results are obtained when the Samples "X", "Y" and "Z" resulfonated desulfonated lignosulfonate materials described in the Third Illustration are employed as retarding agents in amounts varying from 0.2 to 1.2 wt. % of the composition and tested in "LONE STAR No. L" (Class H), "LONE STAR MT" (Class H) and "IDEAL DSU" (Class G) cements using Well Simulation Tests (per API RP-10B) over Schedules 4, 5, 6, 7, 7B and 8. Thickening times (without problems of gellation) of from about 1½ to 4½ hours are experienced with the various retarded cement compositions prepared and tested.

EIGHTH ILLUSTRATION

The resulfonated desulfonated lignosulfonate additive identified in the Fourth Illustration was tested at various concentration levels in Class H cement to check setting times obtained with both fresh water and salt water exposures. The excellent results obtained were as set forth in the following tabulation (with, again, no gellation experienced):

| 12,000 ft. Casing Schedule - 172° F. | | |
|---|---|---|
| Wt. % Retarder | Fresh Water Time | 18% Salt Water Time |
| 0.2 | 1 hr., 47 min. | 2 hrs., 43 min. |
| 0.3 | 3 hrs., 30 min. | 3 hrs., 32 min. |
| 0.4 | 4 hrs., 5 min. | 5 hrs., 14 min. |
| 0.5 | 6 hrs., 14 min. | 6 hrs., 30+ min. |

| 14,000 ft. Casing Schedule - 206° F. | | |
|---|---|---|
| Wt. % Retarder | Fresh Water Time | 18% Salt Water Time |
| 0.3 | 1 hr., 58 min. | 1 hr., 44 min. |
| 0.4 | 3 hrs., 1 min. | 2 hrs., 27 min. |
| 0.5 | 3 hrs., 47 min. | 2 hrs., 45 min. |
| 0.6 | 4 hrs., 9 min. | 3 hrs., 42 min. |
| 0.7 | 5 hrs., 12 min. | 4 hrs., 33 min. |
| 0.8 | | 5 hrs., 12 min. |

Equivalent good results are likewise obtainable with other of the above-delineated resulfonated desulfonated lignosulfonate additive products pursuant to the practice of the present invention including straight (i.e., non-alkyl-unit-containing) organically sulfonated and resulfonated materials and various sulfoethylated and sulfopropylated resulfonated desulfonated lignosulfonate derivative additives.

Many changes and modifications can readily be made and adapted in embodiments in accordance with the present invention without substantially departing from its apparent and intended spirit and scope, all in pursuance and accordance with same as it is set forth and defined in the hereto appended Claims.

What is claimed is:

1. In the process of drilling wells and borings into the earth's surface, including the injection of a hydraulic cement mixture thereinto, the improvement that comprises including in said hydraulic cement mixture, between about 0.05 percent and about 3 percent by weight of the resulting mixture, of a retarding agent composition for said hydraulic cement mixture that is an alkaline oxidized, hydrolyzed, partially desulfonated and subsequently resulfonated lignosulfonate, said resulfonated lignosulfonate having substituted therein as the resulfonation units, those of the formula:

—SO$_3$H, said resulfonated lignosulfonate containing, on a percent by weight basis, based on composition weight, between about 1½ weight percent and about 15 weight percent of total sulfur in combined organic sulfonic sulfonate form; said lignosulfonate prior to resulfonation having a relative molecular size of substantially 1,000 to 20,000.

2. A process as claimed in claim 1, wherein said retarding agent composition includes between about 2¾ and about 10 weight percent of said total combined sulfur.

3. A process as claimed in claim 1, wherein said retarding agent composition includes about 4½ weight percent and about 6½ weight percent of total combined sulfur.

4. A process as claimed in claim 1, wherein said retarding agent composition is present in the form of an alkali metal salt.

5. A process as claimed in claim 4, wherein said salt is a sodium salt.

6. A process as claimed in claim 1, wherein said composition is further characterized by a relatively constant relative molecular size range with a molecular size variation within said range of not more than about 20 percent.

7. A process as claimed in claim 6, wherein said relative molecular size range variation is not more than 10 percent.

8. A process as claimed in claim 1, wherein said retarding agent composition is further characterized in having the introduced sulfonate units substituted at least substantially, in the resulfonated, alkaline oxidized, hydrolyzed, partially desulfonated lignosulfonate material, in one or more of the ortho or para positions on the aromatic rings of the lignin molecules present therein.

9. A process as claimed in claim 8, wherein said substituted introduced sulfonate units are located predominantly in the ortho or para, or both, positions of said aromatic lignin molecule rings.

10. A process as claimed in claim 1, wherein said combined organic sulfonic sulfur is present upon completion of resulfonation in an amount by weight of from 2.75 percent to about 10 percent.

11. A process as claimed in claim 9, wherein said combined organic sulfonic sulfur is present upon completion of resulfonation in an amount of from about 4.5 percent to about 6.5 percent.

12. A process as claimed in claim 1, wherein said resulfonation is undertaken in an aqueous medium and in the presence of a reactant composition comprising about 5 percent to 40 percent, by weight of said desulfonated lignosulfonate, of alkali metal sulfite.

13. A process as claimed in claim 12, wherein said sulfite is an alkali metal bisulfite.

14. A process as claimed in claim 13 wherein said sulfite is sodium bisulfite.

15. A process as claimed in claim 1, wherein said lignosulfonate after resulfonation is characterized in being substantially completely soluble in each of aqueous saline solutions and acid media having a pH of at least about 1.5.

16. A process as claimed in claim 1, wherein said lignosulfonate prior to resulfonation is characterized by a pH in aqueous solution of 8.5 percent to 9.2 percent; a total sulfur content of 2.5 percent to 2.9 percent by weight; the absence of reducing sugars; and a lignosulfonate content of at least 99 percent by weight.

17. A process as claimed in claim 16, wherein said resulfonated lignosulfonate has a relative molecular size of 4200.

18. A process as claimed in claim 16, wherein said resulfonated lignosulfonate has a relative molecular size of about 3500.

* * * * *